Figure 1:
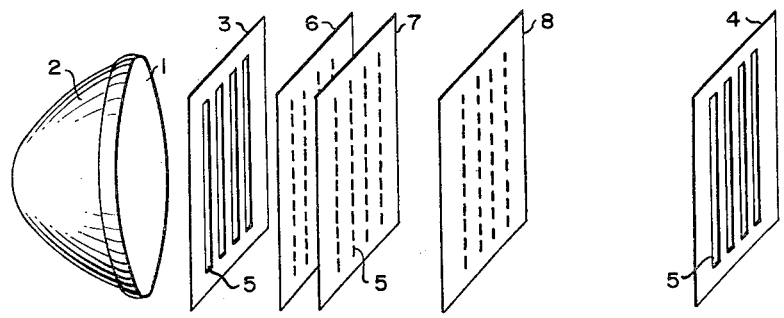

June 23, 1964     E. PARSBERG     3,138,333
RANGING—BEAM LIGHT BEACON

Filed Nov. 16, 1959     3 Sheets-Sheet 1

INVENTOR
ERIK PARSBERG
ATTORNEYS

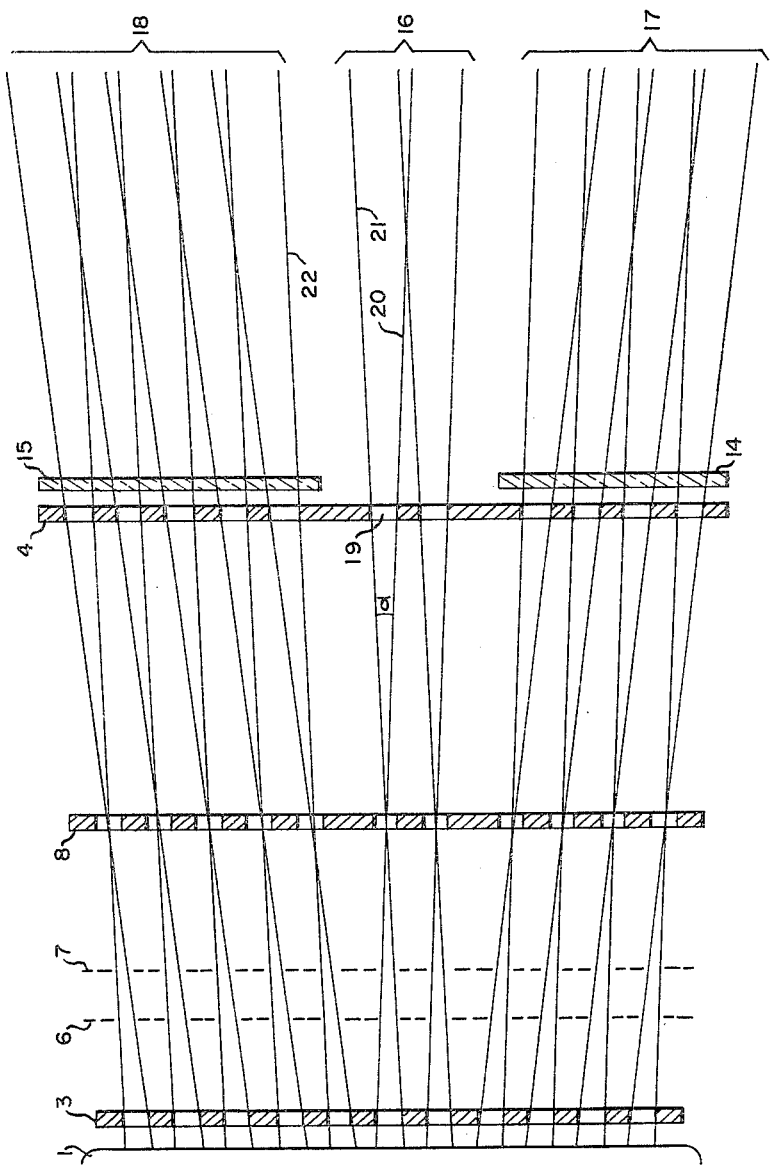

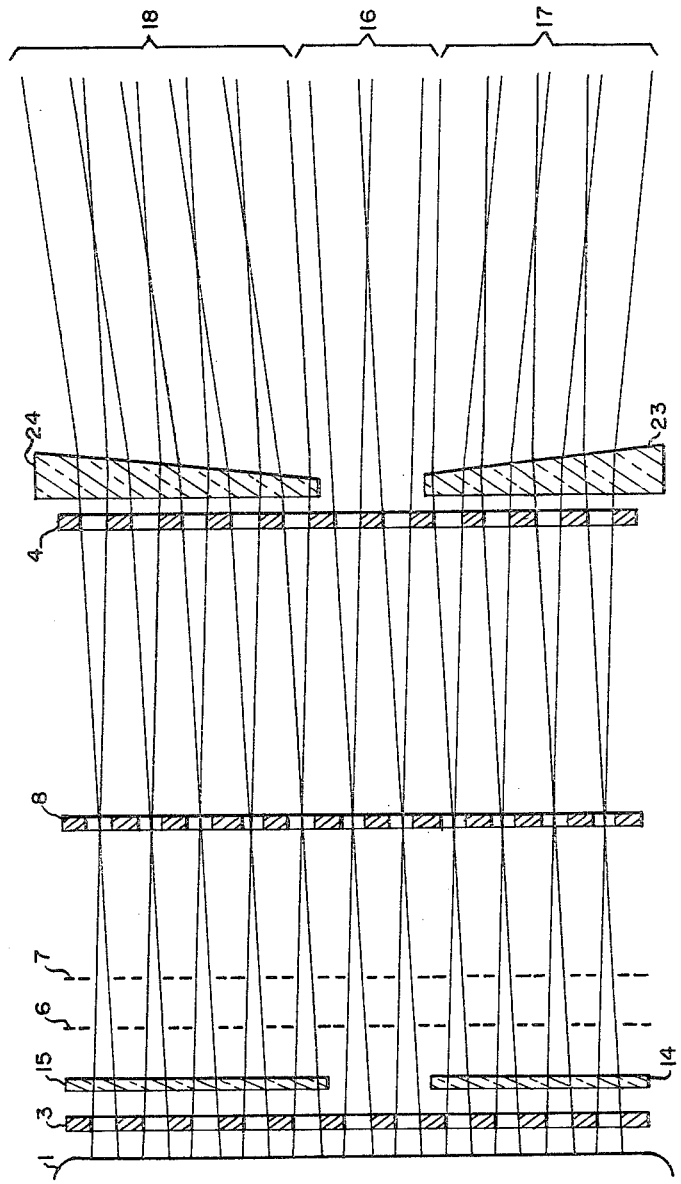

United States Patent Office 3,138,333
Patented June 23, 1964

3,138,333
RANGING-BEAM LIGHT BEACON
Erik Parsberg, Lidingo, Sweden, assignor to Svenska Aktiebolaget Gasaccumulator, Lidingo, Sweden, a corporation of Sweden
Filed Nov. 16, 1959, Ser. No. 853,417
Claims priority, application Sweden Dec. 1, 1958
1 Claim. (Cl. 240—46.01)

When it is desired for the purposes of navigation to indicate a sailing line, for instance for entering into a river mouth, a narrow channel or the like, one has to have recourse either to range lights or to beacons emitting a ranging beam in the form of a narrow light sector indicating the desired course. Range lights require a certain minimum distance between the lights, which may be quite large, and in many cases the topographic conditions render such an arrangement unpractical.

Conventional beacons for emitting a sector shaped light beam usually comprise a drum lens, the object of which is to collect the light from the light source so as to concentrate it chiefly in the horizontal plane. With the aid of coloured glasses for screening certain sectors of the outgoing light it is possible to obtain a white guiding sector having more or less sharply limited coloured sectors, such as a green and a red sector, on both sides. The concentration of the light obtained by means of a drum lens is however limited, so that this method is not ideally suitable from the technical and economical viewpoint. Furthermore, it is not ideal from the nautical viewpoint, because an arrangement comprising a single light source within a drum lens provides a light strength and thus an optical range which varies appreciably between adjacent sectors of different colours unless the size of the lens is made different for the various sectors. In the case of conventional light sources emitting a light beam of relatively large cross-section area, it is furthermore difficult to obtain sufficiently sharp sector boundaries without having recourse to external screening devices, which may become very cumbersome.

The present invention relates to a ranging beam light beacon of high light intensity within all sectors and the light economy of which is excellent at the same time as the technical apparatus is of small dimensions. Any beam projector, such as a lens or a mirror type projector, can be employed and there are no particular requirements as to freedom from scattering of the emitted light.

According to the invention, screening means are employed for a sector of the emitted light in the form of a pair of screens at different distances from the light source, the screen of each sector being provided with a number of light apertures arranged laterally of each other in the plane of the sector angles. Within each sector, the width and mutual spacing of the light apertures may be the same for the two screens, but it is also possible to make these dimensions somewhat larger for the screen at the larger distance from the light source. In order to prevent light from passing through light apertures in the two screens whose positions do not correspond, intermediate screens should be arranged between the two principal screens at such distances from them as to block such light passage.

An object of the invention is to provide a ranging beam light beacon of relatively small dimensions that transmits within a given sector of light from a source within the beacon while effectively blocking transmission of light outside said sector without undue loss of intensity.

Another object of the invention is to provide a novel arrangement of parallel, apertured light screens in a ranging beam light beacon permitting passage of light through the screens only in a selected sector.

Another object of the invention is to provide a novel ranging beam light beacon for transmitting light from a single source in more than one separate sector, the light transmitted in each sector being of a different color and the light transmitted in all sectors being of approximately equal intensity.

Figure 2:
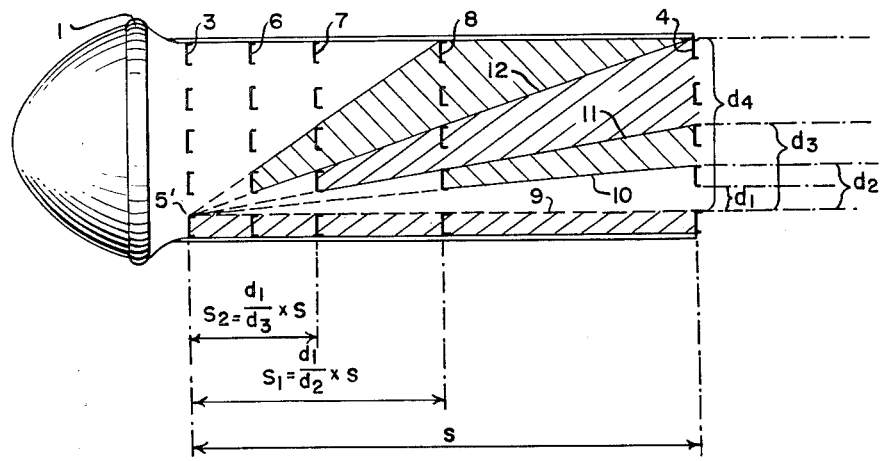

The invention will be described in more detail below with reference to the attached drawing, in which
FIG. 1 is a perspective view of the essential elements of a light beacon in accordance with the invention,
FIG. 2 is a plan view corresponding to FIG. 1, and
FIGS. 3 and 4 are schematic diagrams of beacons having a plurality of sectors.

In FIG. 2 reference character 1 designates a light source 1 having a reflector 2 for reflecting the emitted light generally in the direction of the screen 3.

It is desired to screen the emitted light so that all light leaving the beacon is beamed within a chosen sector angle.

Two screens 3 and 4, both having a series of parallel apertures all of the same width and all spaced with equal distance between apertures are placed at different distances from the light source, both screens parallel and both perpendicular to the plane in which the sector angle lies, and with corresponding apertures of the two screens aligned on an axis parallel to said given plane and perpendicular to the screens. With the screens so arranged the sector angle of the beam of light admitted through corresponding opposed apertures of the two screens 5 and 4 is defined, being a function of the aperture width $d1$ and the distance $S$ between the screens. Thus with a given aperture width, $a$, the desired sector angle is obtained by spacing the screen 4 at the calculated distance $S$ from the screen 3.

In order to screen the emitted light passing through the apertures of screen 3 so that light will be transmitted only between corresponding opposed apertures of the two screens (therefore restricted to the desired sector angle) intermediate light screens 6, 7 and 8 are provided. These intermediate screens are placed parallel to the inner and outer screens and have apertures of the same size as, and in line with, the opposed apertures of the inner and outer screens 3 and 4 so that all light passing through the inner screen 3 within the desired sector angle is transmitted through all of the screens. Considering FIG. 2 with screens 3 and 4 only, light from the source passes through the aperture $5^1$ in screen 3 and is projected across the entire width of screen 4 and passes through all the apertures of screen 4. Only the light passing through the apertures of screen 4 which is opposed to the aperture $5^1$ will be restricted within the desired sector angle, so it is necessary to shade the light passing through aperture $5^1$ from the non-opposed apertures of screen 4.

Before explaining the spacing of the intermediate screens to accomplish this shading, it should be understood that it is necessary that the apertures of the intermediate screens correspond in size and alignment with the corresponding opposed apertures of screens 3 and 4, so that all light passing screen 3 which can be transmitted through screen 4 within the desired sector may pass the intermediate screens. The spaces between apertures of the intermediate screens must shade the light passing through apertures of screen 3 from all non-opposed apertures of screen 4. To explain, we choose a point in aperture $5^1$, shown at the edge which is lower in the drawing. The line 10 extends from this point to the edge of the aperture next to the opposed aperture of screen 4. An intermediate screen is located between screens 3 and 4 to shade the area above line 10. By comparing congruent triangles it is seen that, with the necessary conditions as stated, $$S^1 = \frac{d^1}{d^2} \times S$$

where $S$=distance from screen 3 to screen 4
$S^1$=distance between screen 3 and screen 8
$d^1$=aperture width
$d^2$=aperture width plus spacing width But screen 8 does not shade all the apertures of screen 4. The aperture just above the end of line 11 is exposed to light from the point taken, so a second screen 7 is placed to shade this area above line 11. Again by comparing congruent triangles it is seen that $$S^2 = S \times \frac{d^1}{d^3}$$

where:

$S^2$=the distance from screen 3 to screen 7
$d^3$=the distance along screen 4 intersected by lines 9 and 11.

These two screens 7 and 8 will shade the entire screen 4 as shown but if additional apertures were used a third screen 6 would be needed to shade the area above line 12, and would be located as shown in FIG. 2. Its location can be similarly calculated. It can be shown that when light from the point which we have taken is adequately shaded, light from any point in the aperture of screen 3 is similarly shaded from non-opposed apertures of screen 4.

FIG. 3 illustrates a possible arrangement of a three sector beacon, it being assumed that the middle sector is to serve as a ranging beam and emit white light, whereas the two lateral sectors emit red and green light. The light source is designated 1 and the various screens 3, 6, 7, 8 and 4, the screens 6 and 7 being indicated only as dash lines. The coloured light for the lateral sectors is provided with the aid of filters 14 and 15 placed in the corresponding sectors. It was assumed in the embodiment shown that the filters are positioned outside the external screen 4, but it is obvious that they can be placed anywhere in the light path, for instance inside the screen 3.

FIG. 3 illustrates a simple way of providing the same effective range for the different sectors independently of the colour of the sector. It is well known that, the same strength of the light source being assumed, the power or range of a white sector is the largest, that of a red sector somewhat smaller and that of a green sector still smaller. These differences can be compensated for simply by providing different numbers of apertures for the different sectors. In the embodiment illustrated, there are thus only two apertures in the white middle sector 16, whereas the red sector 17 has four and the green sector 18 five apertures.

FIG. 3 further illustrates the fact that the angle of the sectors is dependent on the distance between the sectors 3 and 4 and on the width of the light apertures. For example, in the case of the middle sector 16, the sector angle α of the light beam passing through the aperture 19 is determined by the lines 20 and 21 passing from one border of a light aperture of the screen 3 to the opposite border of the corresponding light aperture of the screen 4. It is obvious that a very small sector angle can be obtained if the aperture width is made sufficiently small relative to the distance between the screens 3 and 4. This does not reduce the effective light strength and range of the beacon light within this sector, since the light of each sector is composed of light from all the light apertures within the sector, it being assumed the observer is at a sufficiently large distance from the beacon. To provide sharp sector boundaries, for instance between the middle sector 16 and the lateral sector 18, it is essential that the lines 21 and 22 bounding the corresponding sectors be parallel. If the aperture spacing of the screen 3 is constant for all apertures, this result can be obtained by an outward displacement of that portion of the screen 4 which is within the sector 18, the displacement relative to the middle sector being chosen in such a way that the lines 21 and 22 referred to become parallel. Under the conditions assumed, this implies that, in the screen 4, the spacing between the middle sector aperture nearest to the sector 18 and the lateral sector aperture nearest to the middle sector should be three times the width of the light apertures. A corresponding displacement should then be made of those portions of the screens 6, 7 and 8 that lie within the lateral sectors 17 and 18.

FIG. 4 shows a further method of providing separate sectors. In this case, also, the light source is designated 1 and the beacon has screens 3, 4, 6, 7 and 8. Filters in the form of coloured glasses 14 and 15 for the lateral sectors 17 and 18 are placed immediately at the screen 3. The widening of the lateral sectors is provided in this case by means of prisms 23 and 24 in the corresponding sectors. They are shaped and positioned in such a way that for each lateral sector the boundary line adjacent the middle sector coincides with the boundary line of the middle sector. If the prisms 23 and 24 are of suitable shape, for instance with one of the lateral surfaces curved, the extension of the lateral sectors can be made larger than the sector angle provided by the screens 3 and 4 only.

What is claimed is:

Ranging beam light beacon comprising a light source, an inner screen spaced from said light source, farthermost screen lying in a plane parallel with said inner screen, a screen spaced intermediate the other screens, each of said screens having a plurality of spaced, parallel and elongated apertures disposed across the screens, said apertures being grouped to form a middle sector of diverging light and peripheral sectors of diverging light adjacent thereto, said apertures of the inner screen of each diverging light sector corresponding in size and alignment with opposed apertures of corresponding divergent light sectors of the furthermost and intermediate screens, said intermediate and farthermost screens having means blocking the light source between the respective diverging light sectors, said blocking means of the farthermost screen being of greater width than the width of the blocking means of the intermediate screen, said blocking means of the intermediate screen being of greater width than the width of the blocking means between any aperture, to provide sharp sector boundaries wherein the adjacent sector boundaries of the middle sector are parallel to the adjacent boundaries of the adjacent peripheral sectors.

References Cited in the file of this patent
UNITED STATES PATENTS

| | | |
|---|---|---|
| 1,792,046 | Skaupy | Feb. 10, 1931 |
| 2,051,320 | States | Aug. 18, 1936 |
| 2,440,938 | Falge | May 4, 1948 |
| 2,645,976 | Goldsmith | July 10, 1953 |